United States Patent
Chapin et al.

[19]

[11] Patent Number: 5,948,073
[45] Date of Patent: Sep. 7, 1999

[54] MULTIPLEXING BUS CONTROLLER WITH INPUT CONDITIONING

[75] Inventors: Robert M. Chapin, Rushville; Kenneth D. Romano, Webster; Benjamin D. Brown, Ontario; Anthony M. Frumusa, Webster; Phillip A. Sciuto, East Rochester, all of N.Y.

[73] Assignee: Xerox Corporation, Stamford, Conn.

[21] Appl. No.: 08/087,247

[22] Filed: Jul. 7, 1993

[51] Int. Cl.[6] .................................................. G06F 13/00
[52] U.S. Cl. ............................ 710/1; 712/244; 395/500
[58] Field of Search ........................... 395/500; 355/204, 355/310, 208; 710/1; 712/244

[56] References Cited

U.S. PATENT DOCUMENTS

| | | | |
|---|---|---|---|
| 4,120,034 | 10/1978 | Fisk et al. | 355/208 |
| 4,266,294 | 5/1981 | Daughton et al. | 371/24 |
| 4,404,651 | 9/1983 | Crudowski | 395/275 |
| 4,497,041 | 1/1985 | Braun | 395/275 |
| 4,550,382 | 10/1985 | Federico et al. | 364/572 |
| 4,787,024 | 11/1988 | Allsop et al. | 364/132 |
| 4,910,658 | 3/1990 | Dudash et al. | 364/138 |
| 5,037,308 | 8/1991 | Bryce et al. | 439/52 |
| 5,044,964 | 9/1991 | Minerd et al. | 439/67 |
| 5,087,940 | 2/1992 | Altman | 355/204 |
| 5,097,470 | 3/1992 | Gihl | 371/62 |
| 5,233,346 | 8/1993 | Minerd et al. | 340/825.52 |

Primary Examiner—Zarni Maung
Attorney, Agent, or Firm—Oliff & Berridge, PLC

[57] ABSTRACT

A multiplexing bus controller with input conditioning is provided in which the need for a dedicated microprocessor for handling input filtering, input change detection and serial-to-parallel/parallel-to-serial I/O data conversion is eliminated. The controller is realized in a gate array and provides input data oversampling and output refreshing to eliminate random noise coupled to the data lines. In addition, the oversampled data is filtered to debounce the signal received from the input devices. The input data is converted from serial-to-parallel and checked to detect any change from the previous input data stream. Upon detection of an input change, the host microprocessor is interrupted. When the host microprocessor sends data to the bus controller, the bus controller then converts the data to a serial stream for communication to the appropriate output device. Additionally, the bus controller is provided with an internal turnaround circuit to loop back outputs to the inputs for diagnostic purposes. Very low gate counts realized in the design of the multiplexing bus controller allow it to be realized on a single chip.

23 Claims, 7 Drawing Sheets

MULTIPLEXING BUS CONTROLLER WITH INPUT CONDITIONING

FIELD OF THE INVENTION

The present invention relates generally to multiplexing bus controllers and more particularly concerns an interface controller for handling multiple inputs from a plurality of integrated input/output controllers in an electronic reprographic machine.

BACKGROUND OF THE INVENTION

In general, existing copiers, printers and fax machines have several inputs and outputs that must be sensed in order for the machines to function properly. Some of these inputs and outputs sense and turn on/off a wide variety of devices present in the machines, such as, for example, clutches, motors, switches, etc. A microprocessor based controller is generally used to control each and every input/output throughout any particular system. In order for the microprocessor to be able to perform its control function, each and every wire from the respective inputs and outputs must be routed, i.e., harnessed, back to the board containing the microprocessor controller. An average 50 copies per minute copier, for example, may have as many as 200 or more such input and output signals. This high number of input/output signals being routed to and from the microprocessor board can lead to very large wire harness bundles and an almost unmanageable number of connectors on the main processor board to enable communication with the microprocessor controller. In addition to the problem of high harnessing costs associated with this form of input/output control, noise and packaging are also problems associated with this form of input/output control. Moreover, connectors and wires are traditionally the most unreliable components in a copier's electronic subsystems.

One solution to reduce the number of connectors on the main processor board and to overcome the problems associated with the high harnessing requirements described above, has been to multiplex the input/output data onto less wires, thereby reducing the number of wires and connectors required by the system. In a multiplexed system, only one wire is used for inputs and one wire is used for outputs. For example, FIG. 1 shows a multiplexing scheme for a high-end electronic reprographic system. In this system, a plurality of integrated input/output controllers (IIOC) are utilized to control various switches, relays, clutches, etc. associated with the system. The IIOC can be a digital type device or an analog type device. In the analog configuration, the IIOC can be used to provide a reference to set the output voltage or current of a xerographic power supply, for example, as well as to monitor the setting for variations from this setting. In a digital configuration, the IIOC has the capability of providing required higher power drive signals. For example, digitally configured IIOCs can provide connections to electromechanical devices, such as, for example, solenoids and motors as well as the required interface to detect the state of input devices, such as, for example, mechanical switches and optical sensors. These IIOCs are multiplexed using five wire multiplex buses 18, connected in parallel to each IIOC module 20. The multiplex buses 18 require only five wires for the "N" modules connected to each bus. These wires represent serial input data (SID), serial output data (SOD), clock data, power and ground. FIG. 1 shows eight five wire buses 18 connected to the "N" IIOC modules 20.

The controller 10 has a microprocessor 15 that interfaces to the IIOC modules 20 through a device called a serial input/output controller (SIOC) 12. The SIOC, in its basic form performs parallel to serial conversion and serial to parallel conversion with the necessary timing logic to generate the framing pulse and clock signals. The SIOC 12 performs the function of accepting parallel data from the microprocessor 15 and sequentially placing the data onto the outgoing SID line, and collects the incoming serial data from the incoming SOD line and presents that data in parallel to the microprocessor 15. Thus, the SIOC frees the microprocessor 15 from the time consuming task of performing the serial to parallel and parallel to serial conversions and generating the required timing to drive the buses 18. In a high speed or high performance system, this task would be too much of a real time burden but in low speed or low performance environments, this task could be performed by the microprocessor 15 without the SIOC 12.

However, in IIOC/SIOC configured systems, the SIOC must rely on a dedicated microprocessor to filter the inputs received from the individual IIOCs. Since there are many inputs to filter, there is no real time left over to perform any other functions. Thus, a system of this type requires memory and interface hardware in addition to a dedicated microprocessor(s) to achieve suitable input filtering. The dedicated microprocessor and its associated hardware increase both the cost and space requirements of the system to provide compatibility with an IIOC based system architecture.

SUMMARY OF THE INVENTION

If the need for dedicated microprocessor SIOC configurations can be eliminated, the need for an expensive and complex bus control configuration with its related support components and large space requirements would be eliminated. Further, in view of the above problems relating to highly complex IIOC control architectures in high-end electronic reprographic systems, what is needed is a simplified, yet efficient, interface controller for controlling the data exchange between a five wire bus configuration and the plurality of IIOCs associated with each five wire bus. Specifically, an architecture using a chain interface controller specifically designed to handle data transfers between the host controller and the five wire buses that is also capable of generating a framing clock for accurate communications with the various IIOCs without a dedicated microprocessor and its associated support components is needed.

In order to overcome the above and other problems and deficiencies with respect to electronic systems employing an IIOC base architecture, the present invention provides a single chip chain interface controller for providing communications control between the host microprocessor and the IIOCs without a dedicated microprocessor for handling input filtering and the like.

It is, therefore, an object of the present invention to provide a single chip chain interface controller that controls communications between the IIOCs and the host microprocessor without the requirement for a dedicated microprocessor to perform its functions.

It is another object of the present invention to provide a chain interface controller that performs input filtering of the input signals received from the various IIOCs.

It is another object of the present invention to provide a chain interface controller that provides a data clock and a frame clock to control communications between the various IIOCs and the host microprocessor.

It is another object of the present invention to provide a chain interface controller having an internal turnaround mode of operation wherein output data can be looped back to the chain interface controller to enable testing of the controller.

It is another object of the present invention to provide a chain interface controller having an external turnaround mode of operation wherein output data is looped back to the point-of-load to verify load and harness connectivity.

It is another object of the present invention to provide a chain interface controller that provides output refreshing at predetermined intervals to ensure efficient an error-free communications between the IIOCs and the host microprocessor.

It is a further object of the present invention to reduce the cost and complexity of the system architecture without degrading system performance.

To realize these and other objects and to overcome the deficiencies set forth above with respect to conventional electronic reprographic systems, a single chip chain interface controller for providing communications control between the various IIOCs and the host microprocessor without its own dedicated microprocessor is provided, comprises: an oversampling means for eliminating voltage spikes coupled to the incoming data lines; a filtering means for debouncing the oversampled signal; an input data change detection means; an output data refreshing means; and an interrupt signal generating means.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

While this invention is described in detail herein with specific reference to certain illustrated embodiments, there is no intent to be limited to those embodiments. On the contrary, the aim is to cover all modifications, alternatives and equivalents falling within the scope of the invention as defined by the claims.

Figure 1:
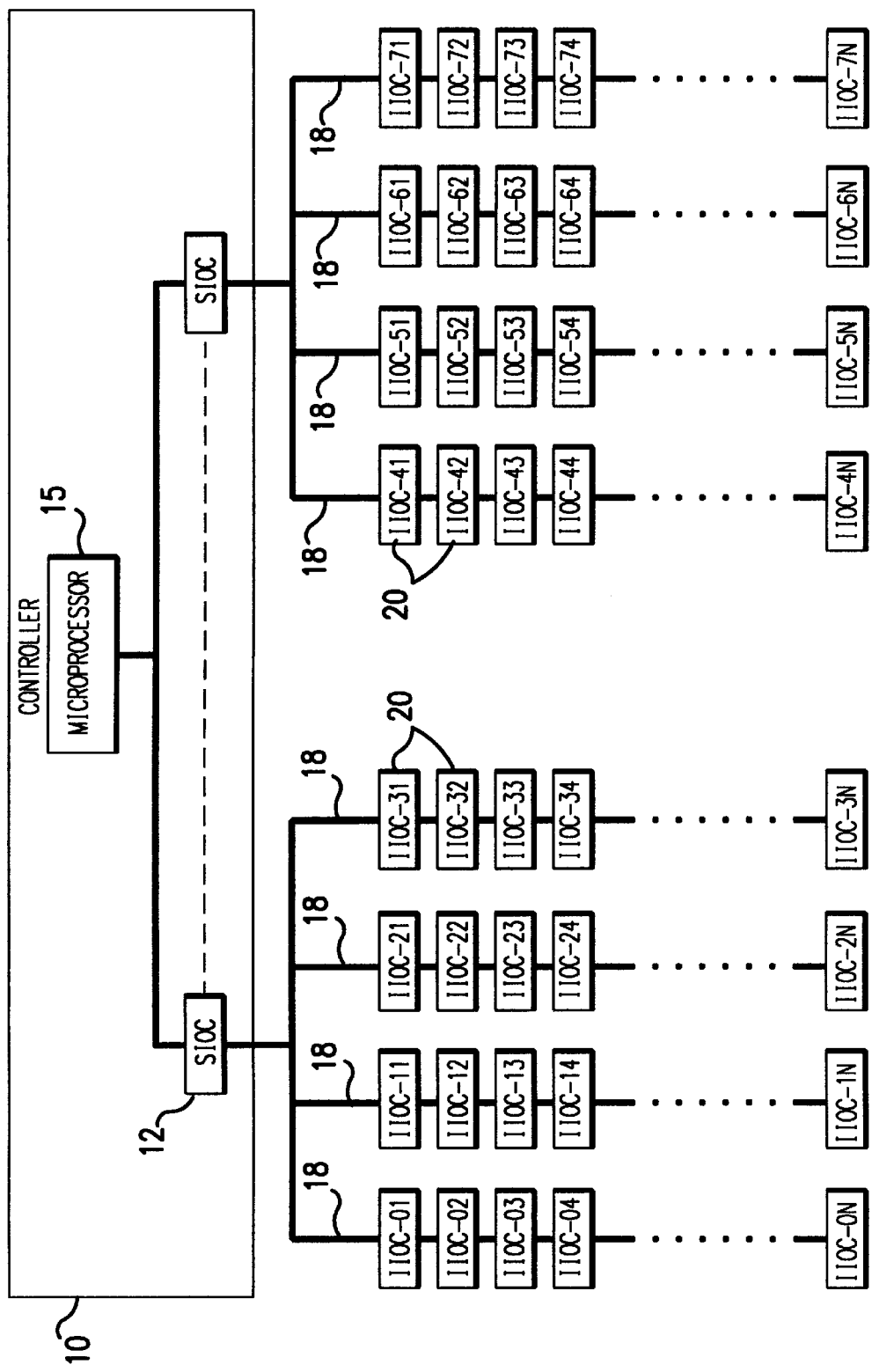
FIG. 1 is a block diagram representing an IIOC architecture using SIOCs.
Figure 2:
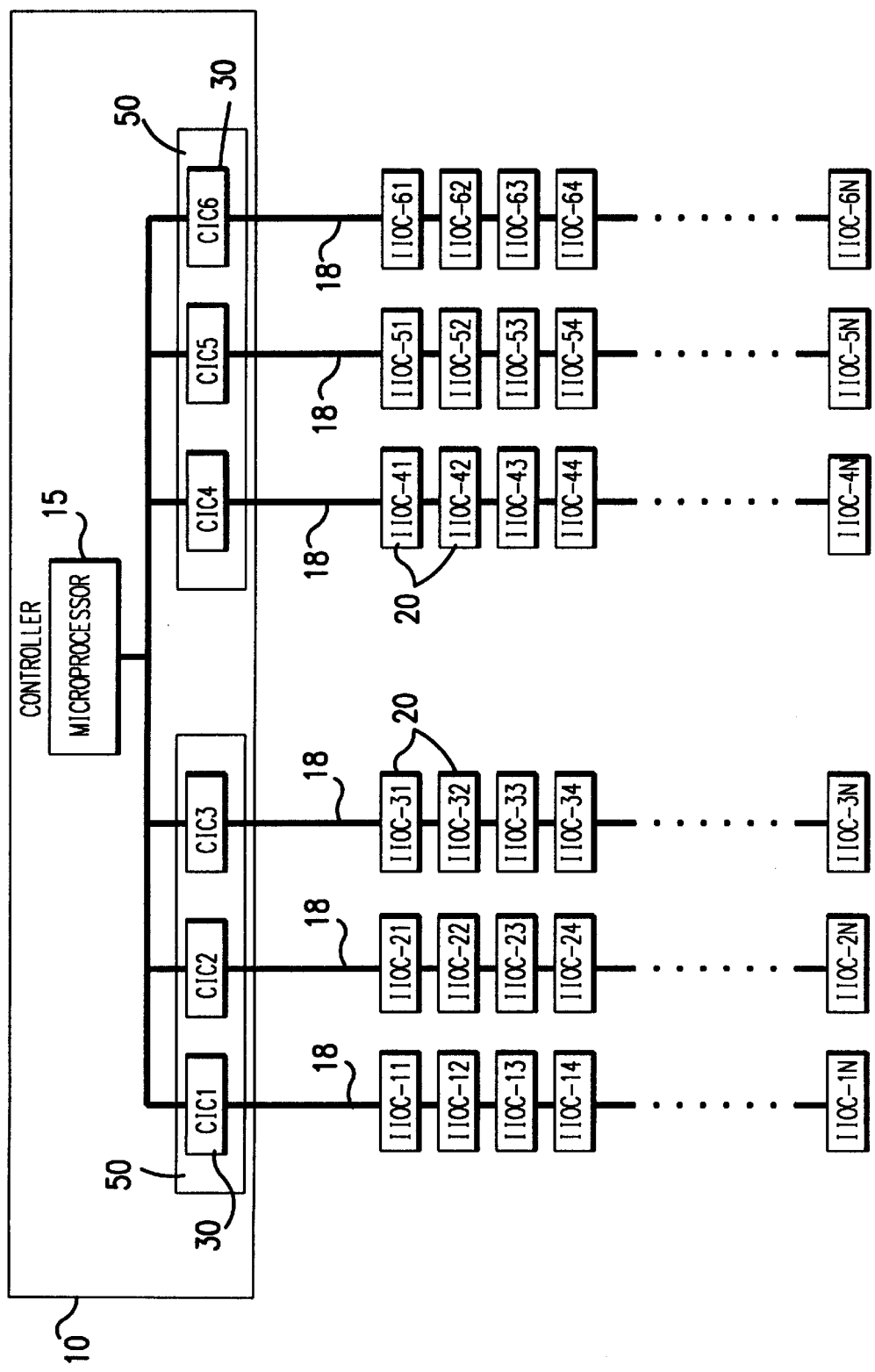
FIG. 2 is a block diagram representing an IIOC architecture in accordance with the present invention.

For a general understanding of the features of the present invention, reference is made to the drawings in which like references have been made throughout to designate identical elements. FIG. 2 is a block diagram showing an IIOC based architecture for an electronic reprographic system employing the chain interface controller of the present invention. It will become evident from the following discussion that the present invention is equally well suited for use in a wide variety of electronic systems and is not necessarily limited in its application to the particular system shown herein.

Turning initially to FIG. 2, during operation of the system, a number of IIOCs 20 are used to control various electrical, mechanical, optical and electromechanical devices within the electronic reprographic system. Each IIOC 20 controls a single device within the system. The IIOCs 20 communicate with the host microprocessor 15 through the controller 10 which multiplexes onto a five wire input/output bus 18. Each input/output bus 18 consists of five wires and is capable of communicating signals to and from up to 32 IIOCs. Other configurations accommodating more or less than 32 IIOCs are also possible, depending on the data clock interval and required system response time. Each input/output bus 18 and its associated IIOCs 20 make up a chain. Each chain is linked back to the microprocessor 15 via its own dedicated chain interface controller 30. Therefore, there is a one-to-one correspondence between the number of chains and the number of chain interface controllers. The chain interface controllers are formed in a single chip configuration using field programmable gate array (FPGA) techniques. Currently, each FPGA is capable of supporting up to four chain interface controllers. In a preferred embodiment, each FPGA supports three individual chain interface controllers. For ease of description and understanding, the general operation of the chain interface controller will be described with reference to only one chain of IIOCs and one chain interface controller, with the understanding that multiple chain interface controllers may be implemented in a single FPGA 50.

Signals indicating the current state of each IIOC 20 in a chain are communicated to the host microprocessor 15 via the chain interface controller 30 dedicated to that particular chain. The input chain of data is subjected to various environmental conditions that may affect the signal on the bus 18 and, therefore, the accuracy of the data read by the host microprocessor 15. Every input that is read by the host microprocessor 15 is subjected to two types of noise. The first type of noise consists of random voltage spikes that are coupled onto the harness (i.e., bus 18) that carries the input signal to the processor board 10. This can cause erroneous readings of the input by the host microprocessor 15, such as, for example, indication of an open switch when in fact the switch is closed. The second type of noise is called "bounce". Bounce is caused by the mechanical action of a switch. When a switch is activated, i.e., opened or closed, the host microprocessor 15 may see multiple "ons" and "offs" until the mechanical action has settled. Ideally, the host microprocessor 15 only wants to know when the switch has changed state and has settled. In order to more accurately assess the information on the individual chains and filter out undesired noise, the chain interface controllers 30 employ a sophisticated, yet simple architecture to process the incoming signals.

Figure 7:
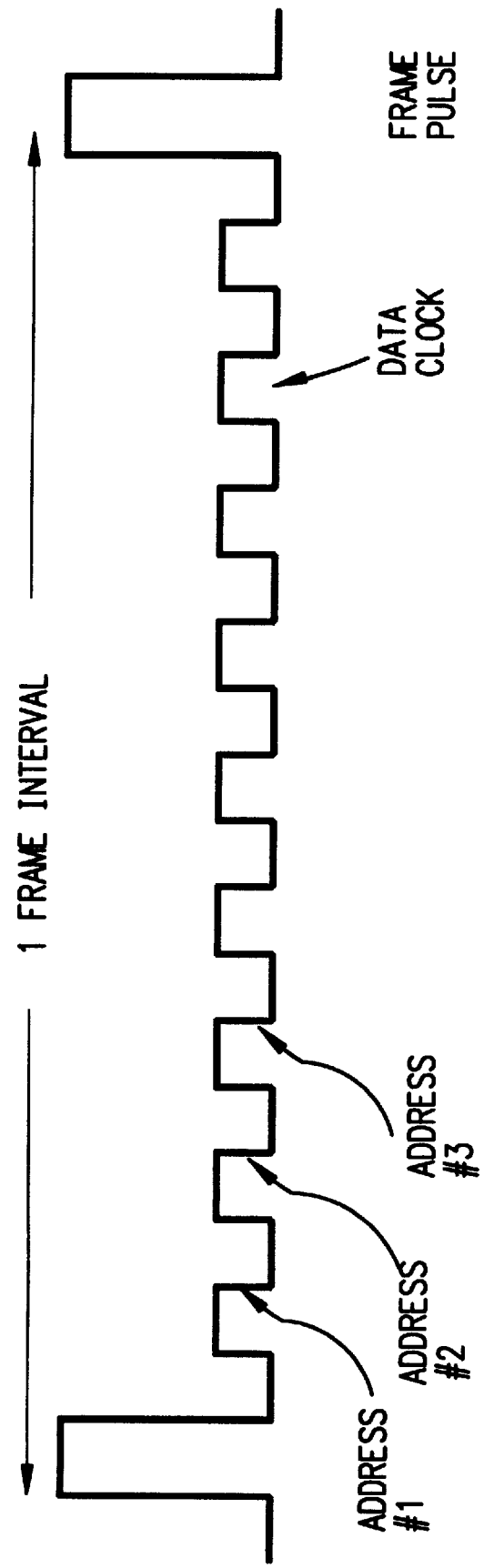
FIG. 7 is a timing diagram showing the data and framing clocks superimposed to represent a frame interval.

With reference to FIG. 7, the bus configuration, as described above, consists of five wires, one wire each for serial input data (SID), serial output data (SOD), clock, power and ground/return. Each IIOC 20 responds to a particular edge of the data clock to which it has been programmed. The SID wire carries output data as a serial stream to the IIOCs 20 while the SOD wire carries input data as a serial stream to the controller 30.

Figure 3:
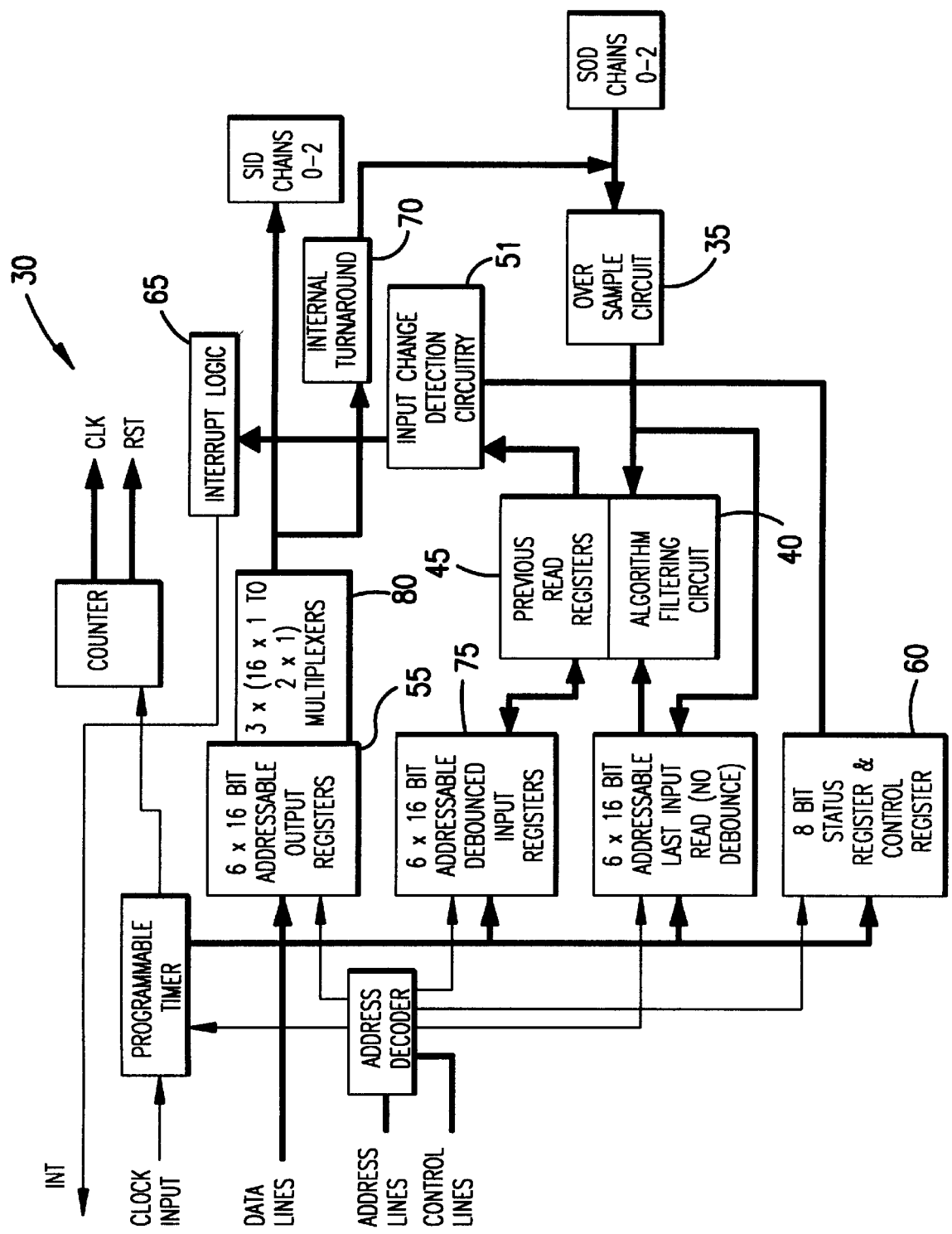
FIG. 3 is a block diagram of the chain interface controller.
Figure 4:
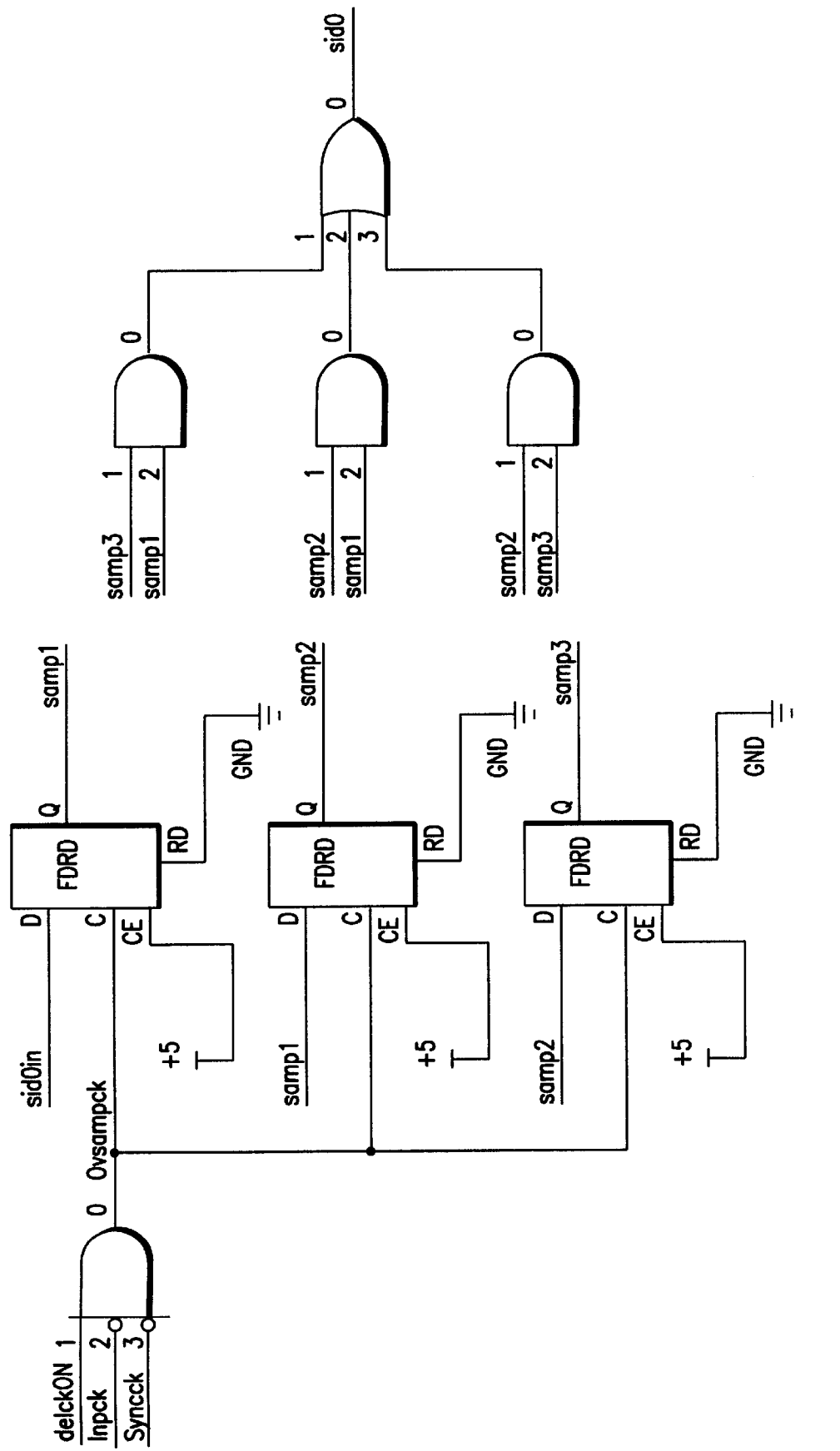
FIG. 4 is a logic diagram showing the oversampling circuit of the chain interface controller.

With reference to FIG. 3 showing a block diagram representative of the chain interface controller 30, the SOD lines are connected to the oversampling circuit 35 of the chain interface controller. The oversampling circuit 35 filters out random noise, such as, for example, voltage spikes, which have coupled onto the serial output data signal. The input data is sampled (i.e., read by the controller) multiple times during its data clock period at predetermined intervals. This is called oversampling. In the oversampling scheme of the present invention, each chain of input data is sampled on a bit-by-bit basis three times during a data clock period of the chain of data. Each sample is taken, for example, at a 1 µs interval from the immediately preceding sample. The oversampling circuit outputs a binary value for each bit that is representative of a majority of the three samples (i.e., at least two of the three samples) taken during the data clock period. Oversampling in this manner filters out noise associated with random voltage spikes coupled to the input lines. A diagram showing the logic circuitry of the oversampling circuit of the present invention is shown in FIG. 4.

Figure 5:
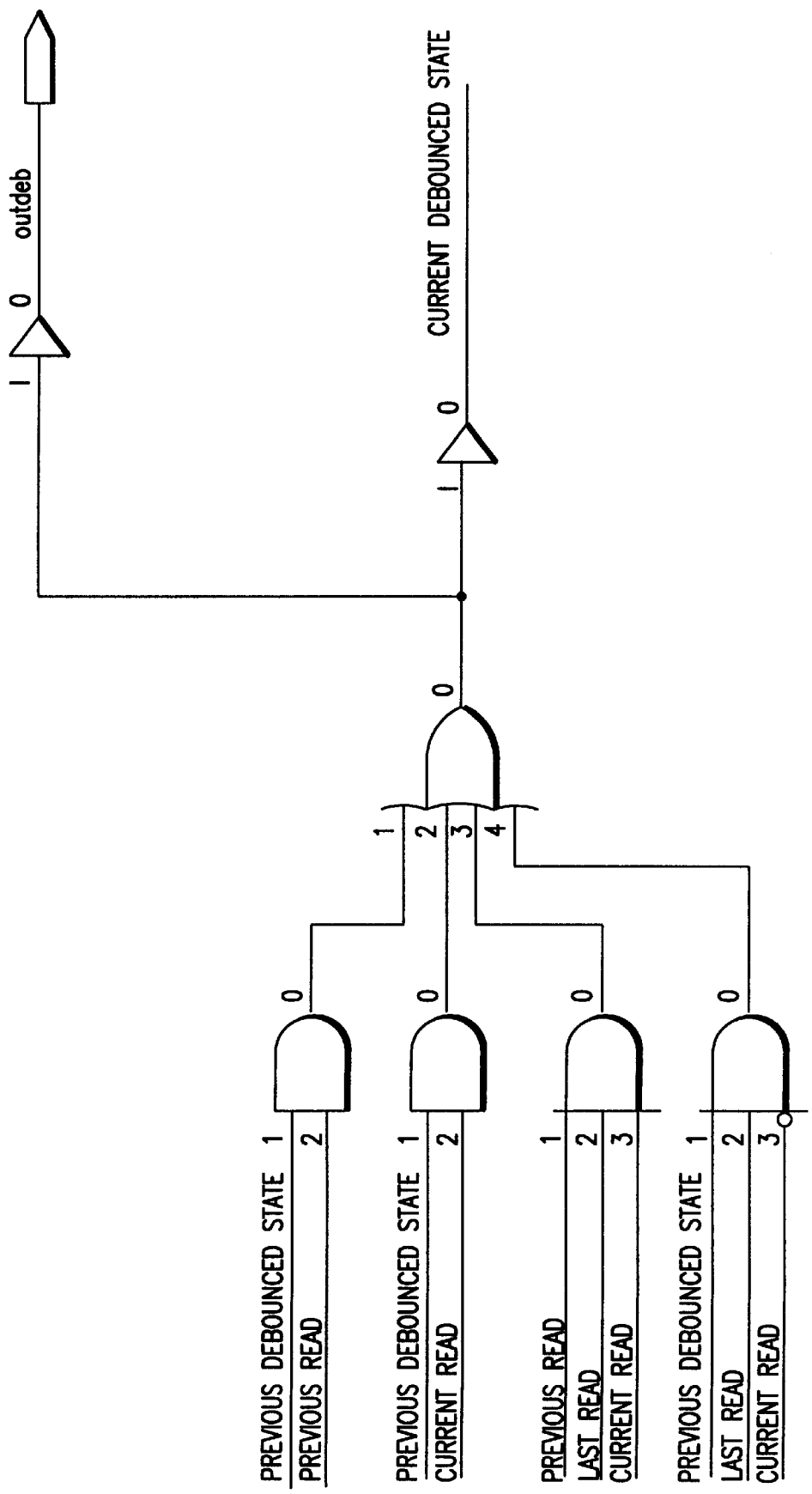
FIG. 5 is a logic diagram showing the filtering circuit of the chain interface controller.

With continued reference to FIG. 3, the data output by the oversampling circuit 35 is then debounced by the filtering circuit 40. The filtering circuit 40 debounces the input data on a bit-by-bit basis by storing two successive readings at the frame interval into the previous read registers 45. The filtering circuit then compares the current input data to the previously read data and updates the debounced input register 75 if all three readings have not changed. For example, if three successive high signals have occurred, over three frame intervals, it would take three low signals to reflect a change in the corresponding bit of the debounced input register 75. The filtering circuit used in the present invention, shown in FIG. 5, is unique because there is only one filtering circuit per input data chain. The data clock increments a selector to the corresponding bit in the last read, previous read and debounced state registers so only one bit of each register is fed through the filtering circuit 40. Other filtering schemes condition inputs in parallel, which requires one filtering circuit per bit and, therefore, a very high gate count. The output from this circuit is stored on a bit basis in the debounced input register 75 (i.e., the filtered input register). Thus, extremely efficient filtering with a minimal gate count is achieved.

Figure 6:
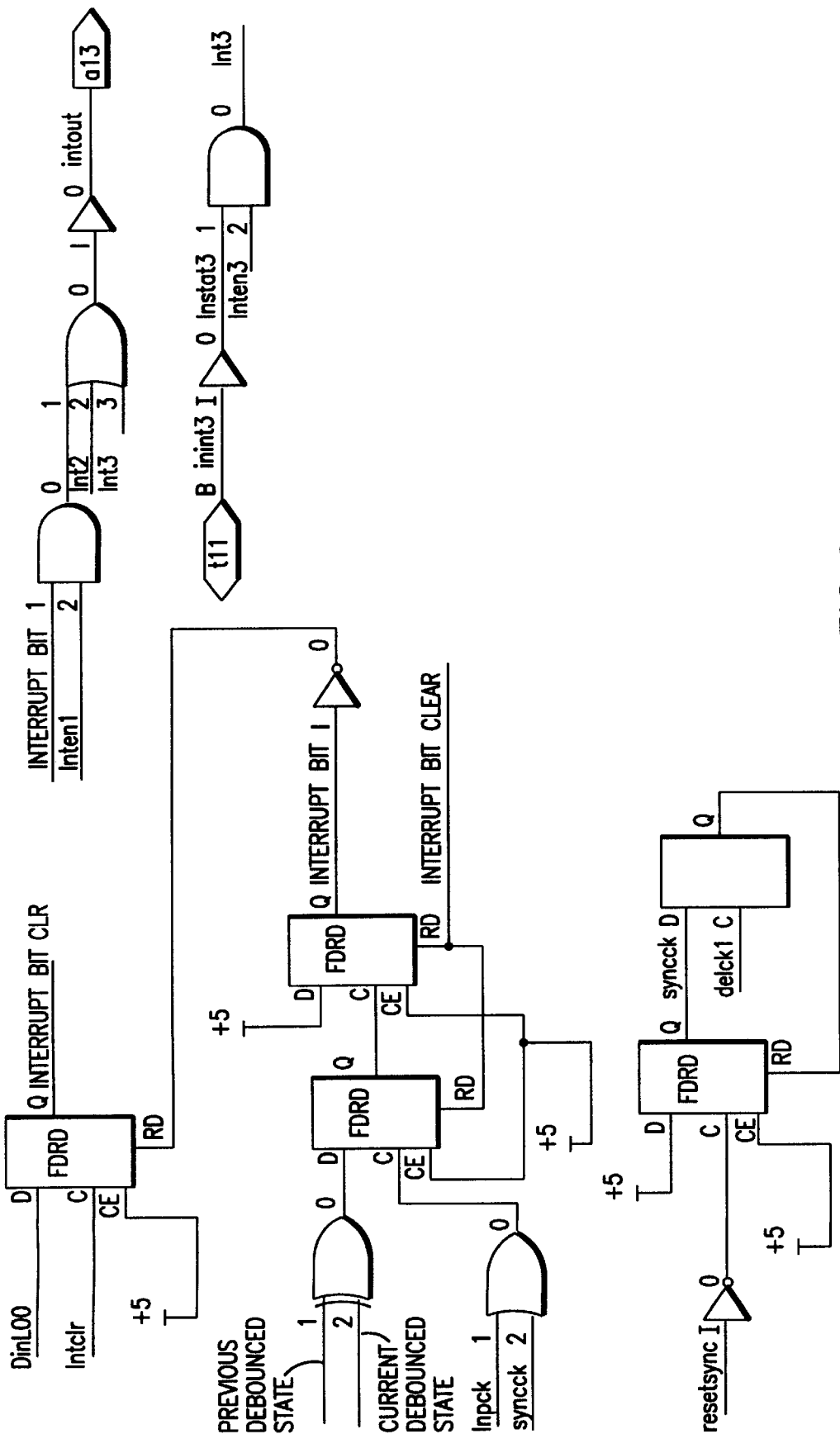
FIG. 6 is a logic diagram showing the input detection circuitry of the chain interface controller.

Referring again to FIG. 3, the input change detector circuit 51 together with the interrupt logic circuit 65 is designed to generate an interrupt signal that is sent to the host microprocessor 15 when an input bit has changed state. The input change detector circuit 51 also sets the corresponding bit in the status register 60. With a change of input state an interrupt will occur. A read of the status register 60 will give the interrupting chain. The data word read can then be written to the interrupt clear register and the proper interrupting chain will be cleared without missing and input changes. Software must then be responsible for isolating the input that changed state by maintaining an input map and comparing it to the filtered input registers of the interrupting chain. Once again the circuit is unique and a very low gate count is achieved by taking advantage of the additional multiplexing of the filtered input registers to accomplish input detection. Without this additional multiplexing scheme, every input would need to be exclusively ORed with its last filtered input reading, and all of them would need to be ORed to clock a flip flop. Therefore, the need for dedicated microprocessors having sophisticated polling schemes is eliminated. The input change detection circuitry is shown in FIG. 6.

Referring again to FIG. 3, the host microprocessor 15 writes output data to the 16-bit wide output registers 55. The output register's data is fed to the multiplexers 80. The multiplexer 80 uses the data clock to shift out (i.e., serialize) the data onto the SID wire. This parallel-to-serial conversion occurs every frame interval, allowing the outputs to be refreshed. Output refresh is required because voltage spikes can induce noise on the SID wire that could change the state (i.e., on or off) of an output. The refresh circuit resends the data from the output register 55 onto the SID wire every frame interval. The IIOC responds to the value on the SID line at the appropriate data clock time and echoes the bit value to the output pin, thereby effectuating the desired output signal.

The chain interface controller is also adapted to run in a variety of operational modes. The above description relates to the normal operational mode of the chain interface controller designated as the Runmode. In the Runmode, outputs will be refreshed every frame interval. and input sampling and addressing will also be performed as described above with additional filtering and oversampling. In addition to the Runmode of operation, the chain interface controller has two "Turnaround" modes of operation called Internal Turnaround and External Turnaround. The Turnaround modes of operation are generally used in a self-test or integration and test environment.

The Internal Turnaround feature is added for diagnostic purposes. When in Internal Turnaround mode, the chain interface controller will internally connect the SID and SOD signals, via an internal turnaround circuit 70 (see FIG. 3), thereby allowing monitoring and verification of operation of the oversampling and filtering circuits as well as all the input and output registers.

The External Turnaround feature is implemented via the IIOC specification by writing a binary "1" to the External Turnaround bit of the control register. This will initiate an IIOC turnaround during the next framing pulse and successive framing pulses until the External Turnaround bit is cleared. By putting the IIOC in External Turnaround mode, the host microprocessor can send test signals to the IIOC and technicians are then able to check the settings and connections of the various components the IIOCs control.

Referring now to FIG. 4, a logic diagram of the oversampling circuit is shown. When data is received by the chain interface controller, it is sampled three times at successive 1 µs. intervals as described above. The chain of data is sampled on a bit-by-bit basis. As can be seen in FIG. 5, sample one, sample two and sample three, are each gated to the logic circuitry and whenever the majority of the samples is the same (i.e., two out of three match), the oversampled bit is sent to the filtering circuit to be debounced. The clocks of the chain interface controller are manipulated such that a 1 MHz clock pulse will provide successive sampling pulses at 1 µs. intervals. Thus, the oversampling circuit will filter out any high frequency noise that may couple onto the SOD lines. Using Karnaugh maps, a minimal gate count was achieved in implementing the oversampling circuit.

Referring to FIG. 5, a logic diagram of the filtering, or debounce, circuit is shown. The oversampled data from the oversampling circuit described above is sent to the filtering circuit to debounce the signal. The signals are sampled on a frame basis, i.e., at 500 µs intervals, the framing pulse of the system. The filter circuitry stores the filtered (debounced) input to the input register for reading by the host microprocessor when an input change is detected by the change detection circuitry. The filtering circuit shown achieves this debouncing function by comparing old debounced signals stored in the filtered input register with previous reads of the same bit in the previous read registers and the data currently being sampled. Again, using Karnaugh maps, the gate count was minimized.

The input detect circuitry of the present invention is shown in FIG. 6. The input detect circuit employs an exclusive OR scheme to generate an input change detected signal when the previous debounced state signal corresponding to a particular bit of the chain of data and the current debounced state signal corresponding to the same address are different. Once this signal is generated, the interrupt signal generator outputs an interrupt signal to the microprocessor indicating that at least one bit of the input data stream has changed. Therefore, by implementing this simple input detect circuit, input change detection is achieved with almost no significant additional gate count. Moreover, input detection interrupt achieved in the above described manner allows drastic reduction in software overhead by eliminating the need for software to poll the debounced input register to detect when an input data bit has changed.

While this invention has been described in conjunction with a specific embodiment thereof, it is evident that many alternatives, modifications and variations will be apparent to those skilled in the art. Accordingly, the preferred embodiments of the invention, as set forth herein, are intended to be illustrative, not limiting. Various changes may be made without departing from the spirit and scope of the invention as defined in the following claims.

What is claimed is:

1. A chain interface controller for controlling a plurality of integrated input/output controllers, wherein the requirement for a dedicated programmed microprocessor for handling data conversion for said chain interface controller is removed, said chain interface controller comprising:

oversampling means for eliminating random voltage spikes from an input chain of digital data, the input chain comprising a plurality of bits, each bit of said plurality of bits corresponding to an integrated input/output controller and representative of a state of said corresponding integrated input/output controller, said oversampling means eliminating random voltage spikes on said input data chain by sampling each bit of said chain of digital data on a bit-by-bit basis three times during a clock period of the chain of data, each sample being taken at a first predetermined interval from an immediately previous sample, said oversampling means outputting a binary value of each bit of said chain of data, said binary value being representative of a majority of three samples of each bit taken during the clock period, said binary value being an oversampled bit of said chain of digital data;

filter means for debouncing said input chain of digital data by receiving said oversampled bits of data from said oversampling means and filtering each of said oversampled bits three times at a second predetermined interval and storing a filtered sample representative of three successive non-changing samples in a filtered input register, said second predetermined interval being representative of a frame clock period;

input data change detecting means for detecting a change in any bit of the chain of data and changing a status bit of the input data chain, said status bit indicating a change of state of any bit of the input data chain;

interrupt signal generating means generating an interrupt signal when one bit of the input data chain has changed state, said interrupt signal being transmitted to a host microprocessor, said host microprocessor locating and reading said filtered sample upon the receipt of said interrupt signal;

a serial output data line for transmitting said input chain of digital data to said oversampling means from said plurality of integrated input/output controllers; and a serial input data line for transmitting an output chain of digital data, said output chain of digital data being a serialized version of parallel output data generated by said host microprocessor for providing instructions to said integrated input/output controllers.

2. The chain interface controller of claim 1, further comprising a circuit loopback means for looping back said output chain of digital data to said oversampling means, wherein said output chain becomes an input chain, said input chain being used to test the chain interface controller.

3. The chain interface controller of claim 1, further comprising a plurality of previous read registers for storing a previously oversampled and filtered chain of input data for comparison to a current chain of input data by the input change detection means.

4. The chain interface controller of claim 3, wherein said interrupt signal signals the host microprocessor to read said chain of input data.

5. The chain interface controller of claim 1, further comprising:

means for converting serial data received on said serial output data line to parallel data representative of an oversampled and filtered chain of data capable of transmission to said host microprocessor; and means for converting parallel data output by said host microprocessor to serial data for output by said chain interface controller over said serial input data line.

6. The claim interface controller of claim 1, wherein said first predetermined interval is 1 $\mu$s and said second predetermined interval is 500 $\mu$s.

7. A method of communicating data between a plurality of integrated input/output controllers and a host, using a chain interface controller to provide data communication control between said integrated input/output controllers and said host, whereby the requirement of a separate microprocessor for handling data conversion, data filtering and input change detection tasks is eliminated, said method comprising:

generating an oversampling clock pulse train for clocking input data, each pulse offset from a previous pulse by a first predetermined interval;

generating a data clock pulse train for clocking a chain of data, said data clock pulse train having a second predetermined interval;

generating a framing clock pulse train for providing a reset/frame pulse, said framing clock pulse train having a third predetermined interval;

oversampling an input data chain to eliminate unwanted voltage spikes coupled to said input data chain to form an oversampled input data chain;

filtering said oversampled input data chain to debounce the oversampled input data chain to form a filtered input data chain;

storing said filtered input data chain as a parallel input data chain in a filtered input register;

comparing the stored filtered input data chain with an incoming chain of input data to determine whether there is a change between said stored filtered input data chain and said incoming chain of input data;

generating an interrupt signal when a change between said stored filtered input data chain and said incoming chain of input data is detected;

transmitting the interrupt signal to the host, said host locating and reading the change upon receipt of the interrupt signal, said host generating an output data chain;

converting said output data chain from parallel to serial format; and transmitting the serialized output data chain to said plurality of integrated input/output controllers.

8. The method of claim 7, wherein said oversampling step comprises:

sampling the input data chain on a bit-by-bit basis three times during a clock period of the input data chain, each sample being taken at said first predetermined interval from an immediately previous sample; and outputting a binary value for each sampled bit of said input data chain, said binary value being representative of a majority of three samples of each bit taken during the clock period of the input data chain.

9. The method of claim 7, wherein said filtering step comprises:

receiving oversampled bits of data oversampled in said oversampling step;

filtering each of the oversampled bits three times at said third predetermined interval; and storing a filtered sample representative of three successive non-changing samples in a filtered input register, said third predetermined interval being representative of said framing clock period.

10. The method of claim 7, further comprising:

re-routing said output data chain directly to an oversampling circuit of the chain interface controller, wherein said output data chain becomes an input data chain for testing the chain interface controller.

11. The method of claim 7, further comprising:

refreshing said output data chain by retransmitting said output data chain to said plurality of integrated input/output controllers every third predetermined interval.

12. The method of claim 7, further comprising:

re-routing said output data chain to the chain interface controller via the plurality of integrated input/output controllers by looping the output data chain from the input terminals of the plurality of integrated input/output controllers to output terminals of the integrated input/output controllers for testing the plurality of integrated input/output controllers.

13. The method of claim 7, wherein said first predetermined interval is 1 $\mu$s, said second predetermined interval is 16 $\mu$s and said third predetermined interval is 500 $\mu$s.

14. A chain interface controller for controlling a plurality of integrated input/output controllers, wherein a requirement for a dedicated microprocessor for handling data conversion, data filtering and input change detection is removed, said chain interface controller comprising:

an oversampling circuit sampling a chain of input data on a bit-by-bit basis, whereby random voltage spikes coupled to said input data are eliminated;

a filtering circuit in selective communication with said oversampling circuit, wherein said filtering circuit debounces an oversampled chain of input data on a bit-by-bit basis;

a filtered input register coupled to said filtering circuit, said filtered input register storing a filtered sample representative of three successive nonchanging samples of said oversampled chain of input data from said filtering circuit;

an interrupt signal generator in selective communication with an input change detector, said input change detector detecting a change in the chain of input data, on a bit-by-bit basis, from a previous state as stored in the filtered input register, said interrupt signal generator generating an interrupt signal when said input change detector detects a change in the chain of input data;

a plurality of serial output data lines in multiplexed electrical communication with said plurality of integrated input/output controllers, said serial output data lines carrying a serial chain of input data to said chain interface controller;

a plurality of multiplexers converting an output chain of data generated by a host controller from parallel to serial format; and a plurality of serial input data lines in electrical communication with said plurality of multiplexers, said serial input data lines transmitting said output chain of data in serial format to said plurality of integrated input/output controllers.

15. The chain interface controller of claim 14, further comprising:

an internal turnaround circuit looping said output chain of data output by said plurality of multiplexers to said oversampling circuit, wherein said output chain of data is used to test said chain interface controller.

16. The chain interface controller of claim 14, wherein said oversampling circuit samples each bit of said input data chain on a bit-by-bit basis three times during a clock period of the chain of data, each sample being taken at a 1 $\mu$s interval from an immediately previous sample.

17. The chain interface controller of claim 14, wherein said filtering circuit debounces said oversampled data three times at successive 500 $\mu$s intervals and outputting a filtered sample representative of three successive non-changing samples to said filtered input register.

18. The chain interface controller of claim 14, further comprising a plurality of previous read registers storing a previous oversampled and filtered chain of input data, said previous oversampled and filtered chain of input data being compared to a current oversampled and filtered chain of input data by said input detector to detect a change in status of any bit in the chain of input data.

19. The chain interface controller of claim 14, further comprising:

an eight-bit status register storing said chain of input data; and a control register outputting said chain of input data in said status register when said interrupt signal generator detects a change in the chain of input data.

20. A gate array, comprising:

a plurality of chain interface controllers, each chain interface controller comprising:

an oversampling circuit sampling a chain of input data on a bit-by-bit basis, whereby random voltage spikes coupled to said input data are eliminated;

a filtering circuit in selective communication with said oversampling circuit, wherein said filtering circuit debounces an oversampled chain of input data;

a filtered input register coupled to said filtering circuit, said filtered input register storing a filtered sample representative of three successive nonchanging samples of said oversampled chain of input data from said filtering circuit;

an interrupt signal generator in selective communication with an input change detector, said input change detector detecting a change in the chain of input data from a previous state as stored in the filtered input register, said interrupt signal generator generating an interrupt signal when said input change detector detects a change in the chain of input data;

a serial output data line in multiplexed electrical communication with a plurality of integrated input/output controllers, said serial output data line carrying a serial chain of input data to said chain interface controller;

a plurality of multiplexers converting an output chain of data generated by a host controller from parallel to serial format; and a serial input data line in electrical communication with said plurality of multiplexers, said serial input data line transmitting said output chain of data in serial format to said plurality of integrated input/output controllers.

21. The gate array of claim 20, wherein said gate array is a field-programmable gate array.

22. The gate array of claim 20, further comprising:
a plurality of serial input data lines, each said serial input data line being in electrical communication with a chain of integrated input/output controllers; and
a plurality of serial output data line, each said serial output data line being in multiplexed electrical communication with a chain of integrated input/output controllers.

23. The gate array of claim 22, wherein a chain of integrated input/output controllers comprises between one and thirty-two integrated input/output controllers.

\* \* \* \* \*